(12) United States Patent
Sudo (10) Patent No.: US 6,281,668 B1
(45) Date of Patent: Aug. 28, 2001

(54) SWITCHING REGULATOR CONTROL CIRCUIT OF PFM SYSTEM AND SWITCHING REGULATOR THEREOF

(75) Inventor: Minoru Sudo, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/251,609

(22) Filed: Feb. 17, 1999

(30) Foreign Application Priority Data

Feb. 18, 1998 (JP) .................................................. 10-036181

(51) Int. Cl.[7] .................................................. G05F 5/00
(52) U.S. Cl. .................................................. 323/299; 363/41
(58) Field of Search .................................. 323/299, 303; 363/39, 40, 41

(56) References Cited

U.S. PATENT DOCUMENTS

| 4,437,769 | 3/1984 | Shida et al. ........................ 323/299 X |
| 5,260,645 | * 11/1993 | Williams et al. ..................... 323/299 |
| 5,319,174 | 6/1994 | Omori et al. ........................ 363/97 X |

\* cited by examiner

Primary Examiner—Jessica Han
(74) Attorney, Agent, or Firm—Adams & Wilks (57) ABSTRACT

In order to avoid a ripple voltage and to ensure that an adequate voltage is applied to a load even when a supply voltage is low, the duty ratio of a PFM type switching regulator is provided with a supply voltage dependency. A control circuit for a PFM type switching regulator according to a first embodiment comprises a first circuit for producing a first output signal based on a difference between a fed back portion of a regulated output voltage of a PFM type switching regulator and a first reference voltage; and a second circuit for producing a second output signal based on a second reference voltage, the second output signal being used for modulating the first output signal and including a pulse signal having successive pulses the width of which is dependent upon the value of the second reference voltage so that the duty cycle of the PFM type voltage regulator is dependent upon the second reference voltage. The second reference voltage varies depending upon the value of a power supply voltage of the PFM type switching regulator so that the duty ratio is increased when the power supply voltage decreases and the duty ratio decreases when the power supply voltage increases.

8 Claims, 12 Drawing Sheets

SWITCHING REGULATOR CONTROL CIRCUIT OF PFM SYSTEM AND SWITCHING REGULATOR THEREOF

BACKGROUND OF THE INVENTION

The present invention relates to a switching regulator (hereinafter referred to as a "SW regulator") control circuit and an SW regulator of the PFM (pulse frequency modulation) type which can supply a large current to a load even with a low-input power supply voltage in accordance with a value of an input supply voltage of a SW regulator, and which is small in ripple voltage even with a high input power supply voltage.

Figure 5:
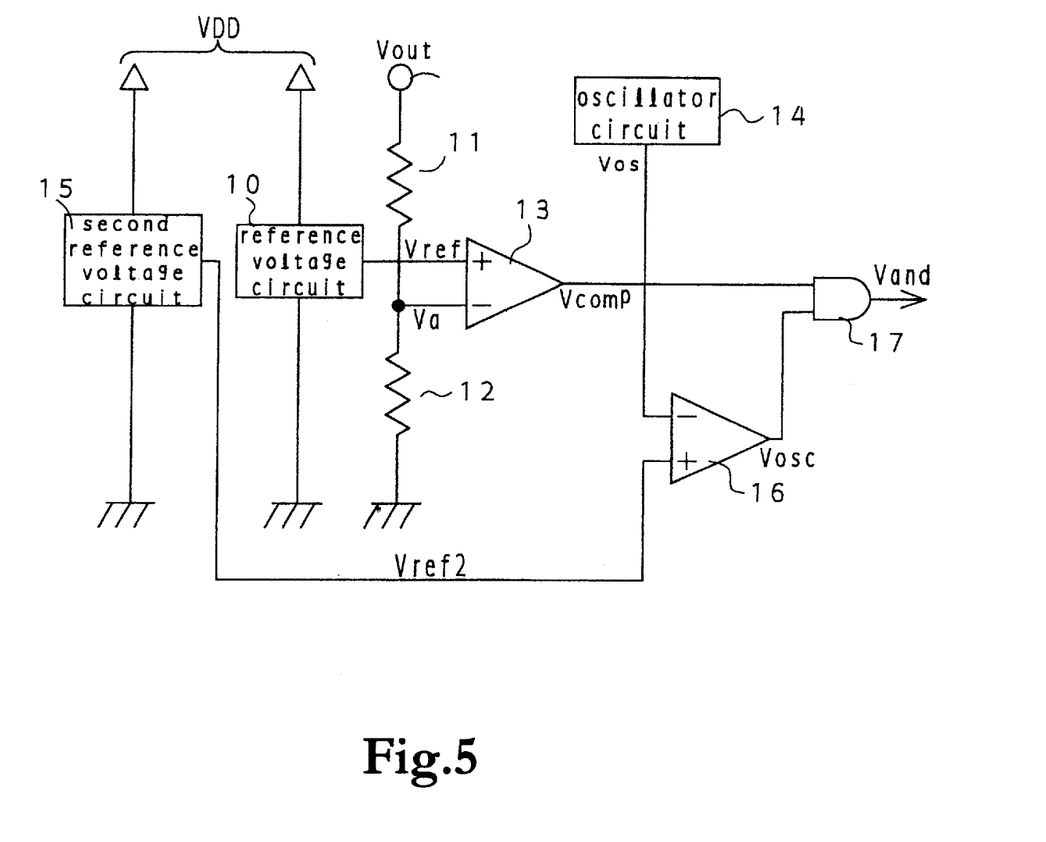
FIG. 5 is an explanatory diagram showing a conventional SW regulator control circuit of the PFM system.

As a conventional PFM SW regulator control circuit, there has been known an SW regulator control circuit shown in a circuit diagram of FIG. 5. That is, there is provided a comparator 13 that compares a reference voltage value Vref of a first reference voltage circuit 10 with a voltage at a node of bleeder resistors 11 and 12 that divide an output voltage Vout of an output terminal 5 of the SW regulator. Assuming that the output voltage of the reference voltage circuit 10 is Vref, and the voltage of the node of the bleeder resistors 11 and 12 is va, if Vref>Va, an output Vcomp of the comparator 13 becomes high in level, but conversely, if Vref<Va, the output Vcomp becomes low in level. The output Vcomp of the comparator 13 is supplied to one input terminal of an AND gate 17, and an output Vosc of a second the comparator 16 is supplied to the other input terminal of the AND gate 17. The output Vosc of the second comparator 16 compares triangular wave Vos outputted from an oscillator circuit 14 with a reference voltage value Vref2 of a second reference voltage circuit 15 to produce a rectangular wave having a given duty ratio (hereinafter referred to as "duty ratio"). The ratio of turning on a switch element used in the SW regulator to the oscillatory period is a PFM-DUTY ratio. In other words, when the output voltage is lower than a normal voltage, an output Vcomp of the first comparator 13 becomes high in level, and the second output Vosc of the comparator 16 is made equal to the output Vand of the AND gate 17 with the result that the switch element used in the SW regulator is turned on/off by the output Vosc. Conversely, when the output voltage is higher than the normal voltage, the output of the first comparator 13 becomes low in level, and the output Vand of the AND gate 17 becomes low in level with the result that the switch element used in the SW regulator is kept in an off state.

Figure 6:
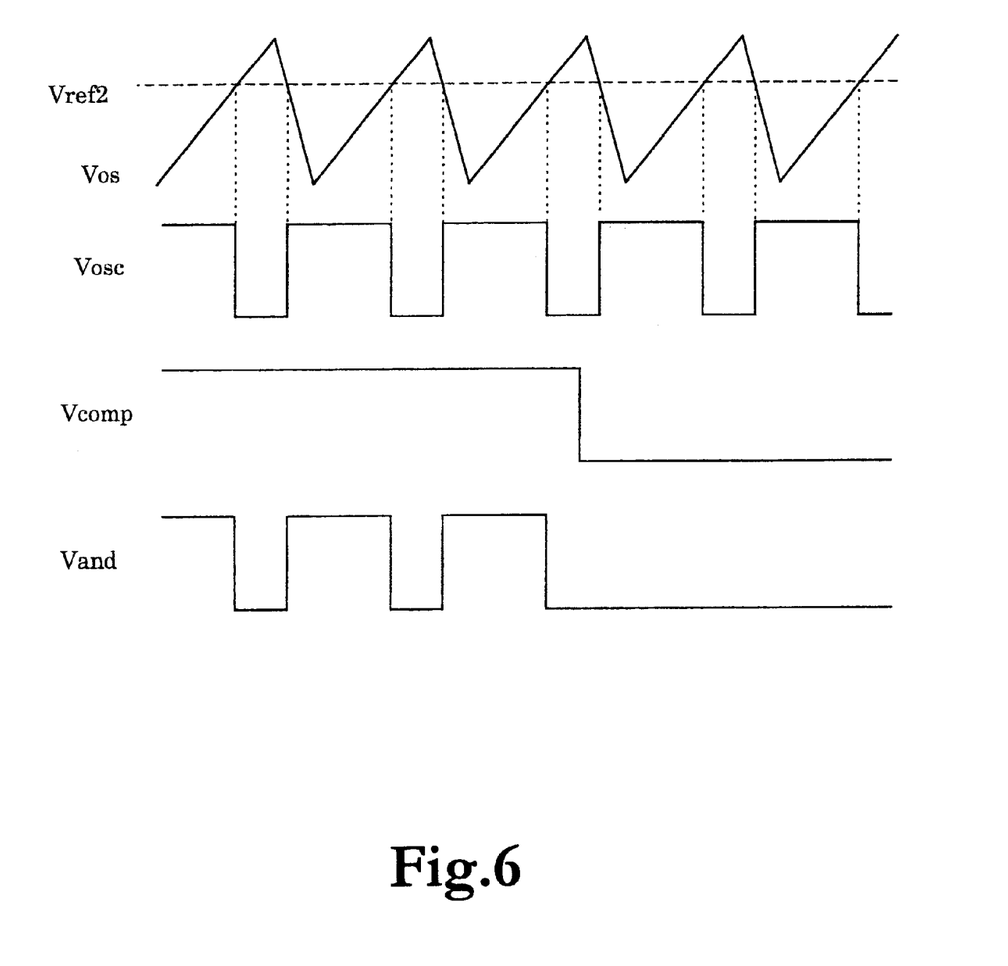
FIG. 6 is an explanatory diagram showing the operation of the SW regulator control circuit of the PFM system shown in FIG. 5.

FIG. 6 shows the voltage waveforms of the respective portions of the SW regulator shown in FIG. 5 with the axis of abscissa representing time.

In general, in the SW regulator, as a period of time during which the SW is on is long, a capacity for supplying an electric power to the load becomes higher. Accordingly, in case of the SW regulator of the PFM system, even if the load is heavy to some degree, the PFM-DUTY ratio is set at a certain value of about 50 to 90% so that an energy can be supplied sufficiently. The PFM-DUTY ratio is always held to a constant value regardless of the supply voltage.

However, the conventional SW regulator of the PFM type suffers from the following problems. That is, because the PFM-DUTY ratio is held constant regardless of the supply voltage, if the PFM-DUTY ratio is set to be small, when the supply voltage is low, the energy in a coil used in a PFM to switching power supply is small so that a large load current cannot be supplied. Also, if the PFM-DUTY ratio is set to be large, when the supply voltage is high, because energy in a the coil of the switching power supply is large, a large ripple voltage occurs in the output voltage.

In view of the above, in order to solve the conventional problems, an object of the present invention is to impart a supply voltage dependency to the PFM-DUTY ratio of the SW regulator of the PFM type so as to set the PFM-DUTY ratio to be large when the supply voltage is low, and to set the PFM-DUTY ratio to be small when the supply voltage is high, so that an energy can be sufficiently supplied to a load even at a low supply voltage, and a ripple voltage is suppressed when the supply voltage is high.

SUMMARY OF THE INVENTION

In order to solve the above problems, according to the present invention, there is provided an SW regulator control circuit of the PFM system in which a supply voltage dependency is imparted to the PFM-DUTY ratio, thereby being capable of suppressing a ripple voltage when the supply voltage is high.

DETAILED DESCRIPTION

A supply voltage dependency is imparted to the PFM-DUTY ratio, and the PFM-DUTY ratio is set to be small when the supply voltage is high, thereby suppressing a ripple voltage when the supply voltage is high.

Figure 1:
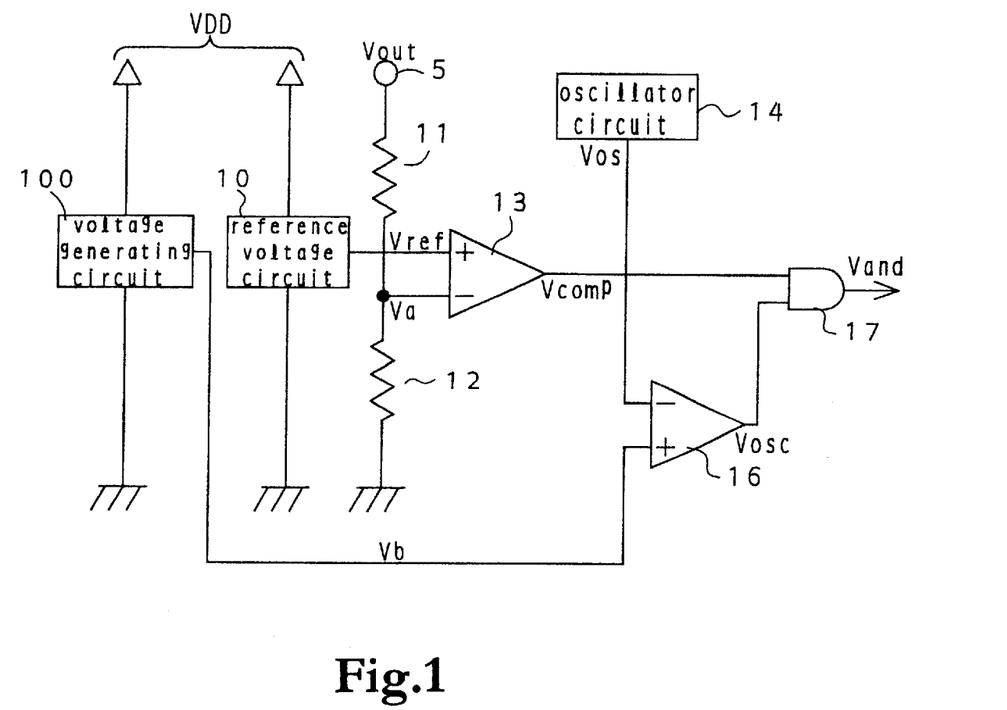
FIG. 1 is an explanatory diagram showing an SW regulator control circuit of a PFM system in accordance with the present invention.

Hereinafter, the present invention will be described with reference to the accompanying drawings. FIG. 1 is a diagram showing an SW regulator control circuit in accordance with an embodiment of the present invention. A reference voltage circuit 10, bleeder resistors 11, 12, comparators 13, 16, an oscillator circuit 14 and an AND gate 17 are identical with those in the prior art. To a plus input terminal of the comparator 16 is inputted not a given voltage as a reference voltage but a variable output voltage value Vb of a voltage generating circuit 100.

The output voltage value Vb of the voltage generating circuit 100 has a supply voltage dependency and becomes low when the supply voltage VDD is high but, conversely, high when the supply voltage VDD is low. Since the duty ratio of an output Vosc of the comparator 16 is determined by a triangular wave Vos outputted from the oscillator circuit 14 to the minus input of the comparator 16 and the level of Vb at the plus input thereof, if the voltage of Vb is high, the duty ratio becomes large, and if the voltage of Vb is low, the duty ratio becomes small.

Figure 2A:
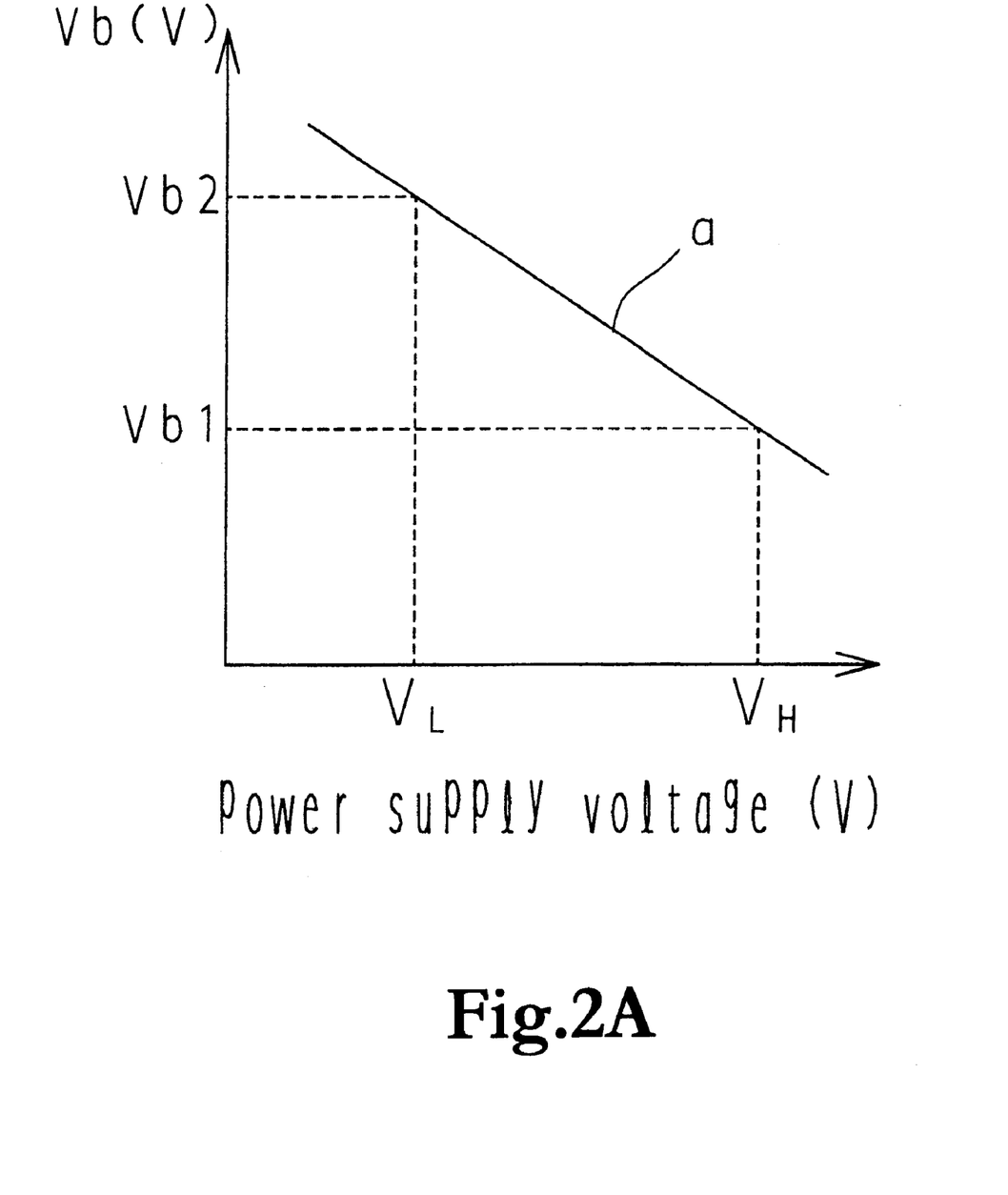
FIG. 2A is an explanatory diagram showing the operation of the SW regulator control circuit of the PFM system shown in FIG. 1.
Figure 2B:
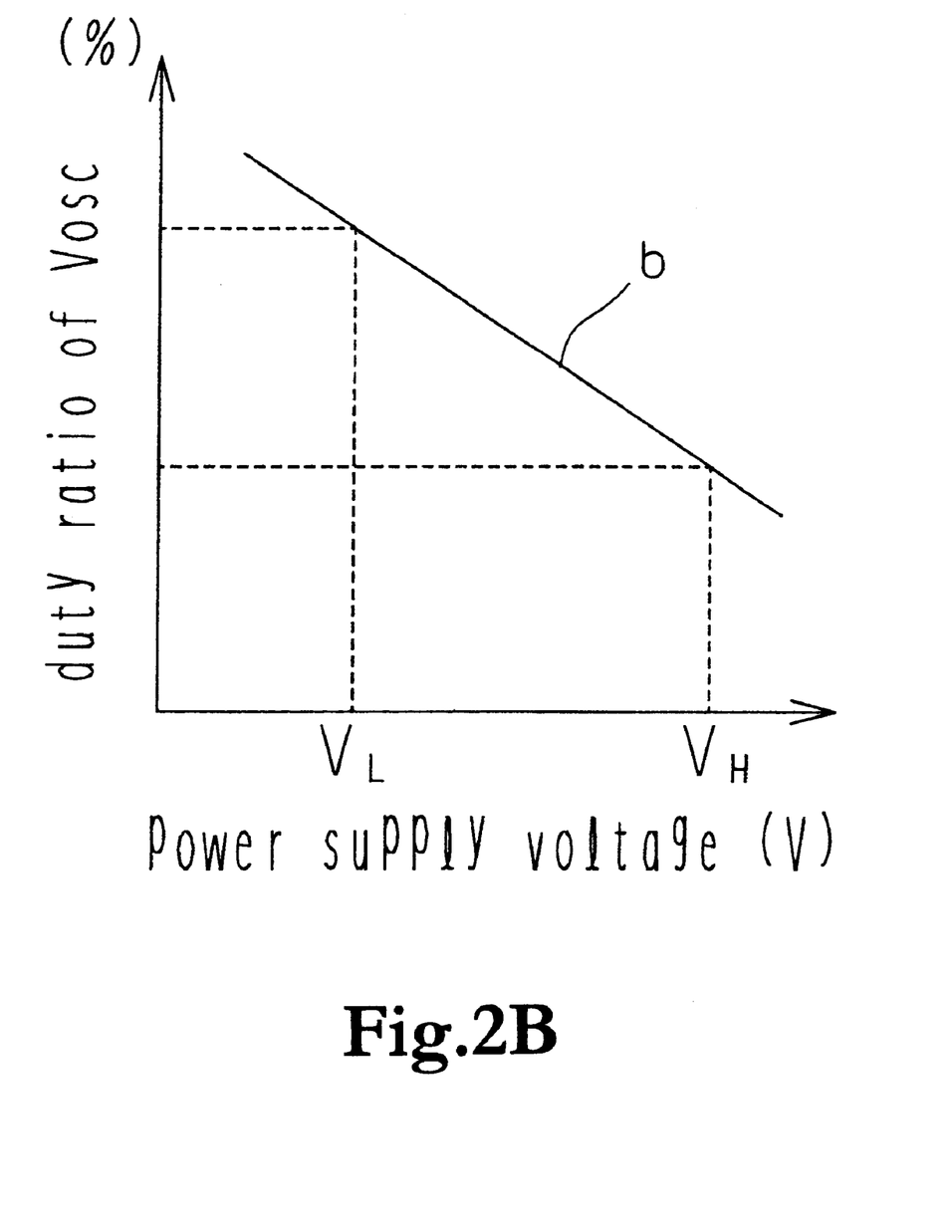
FIG. 2B is an explanatory diagram showing the operation of the SW regulator control circuit of the PFM system shown in FIG. 1.
Figure 7:
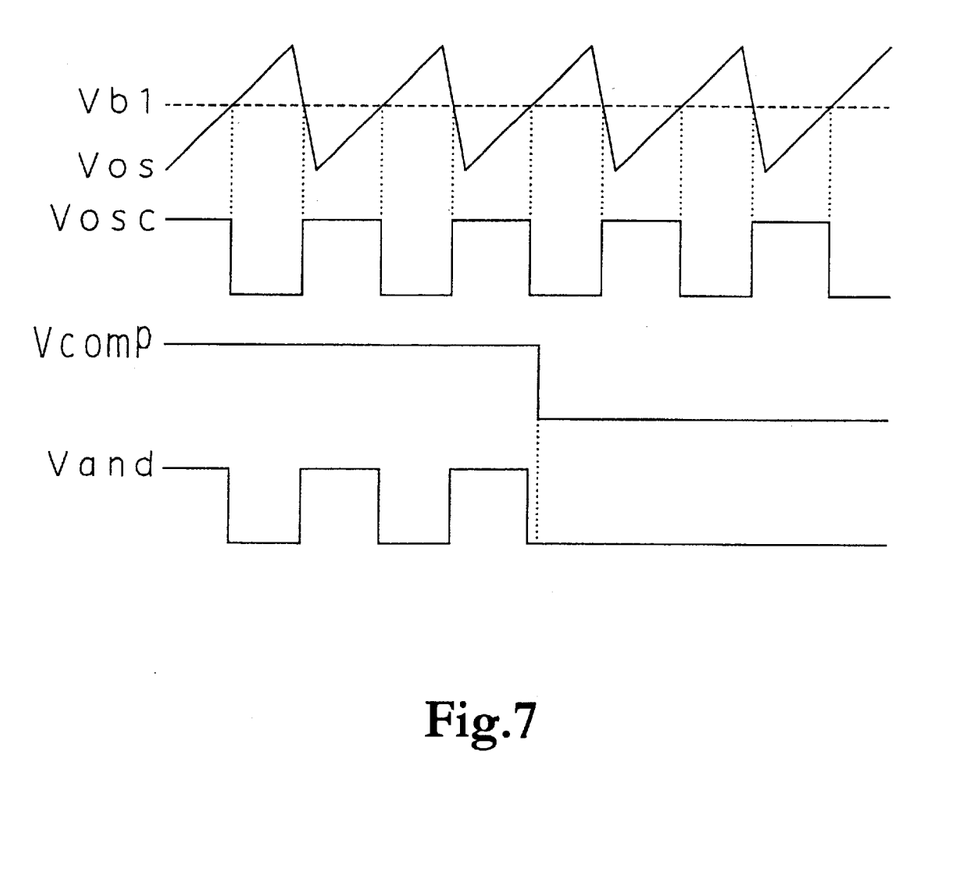
FIG. 7 is an explanatory diagram showing the operation of the SW regulator control circuit of the PFM system shown in FIG. 1.
Figure 8:
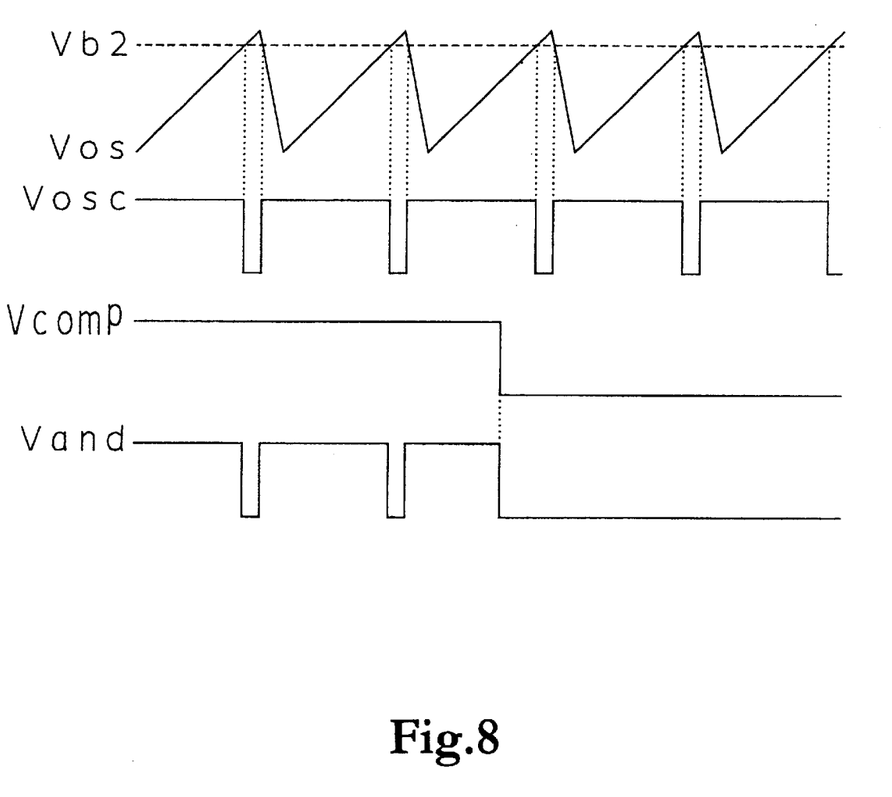
FIG. 8 is an explanatory diagram showing the operation of the SW regulator control circuit of the PFM system shown in FIG. 1.
Figure 9:
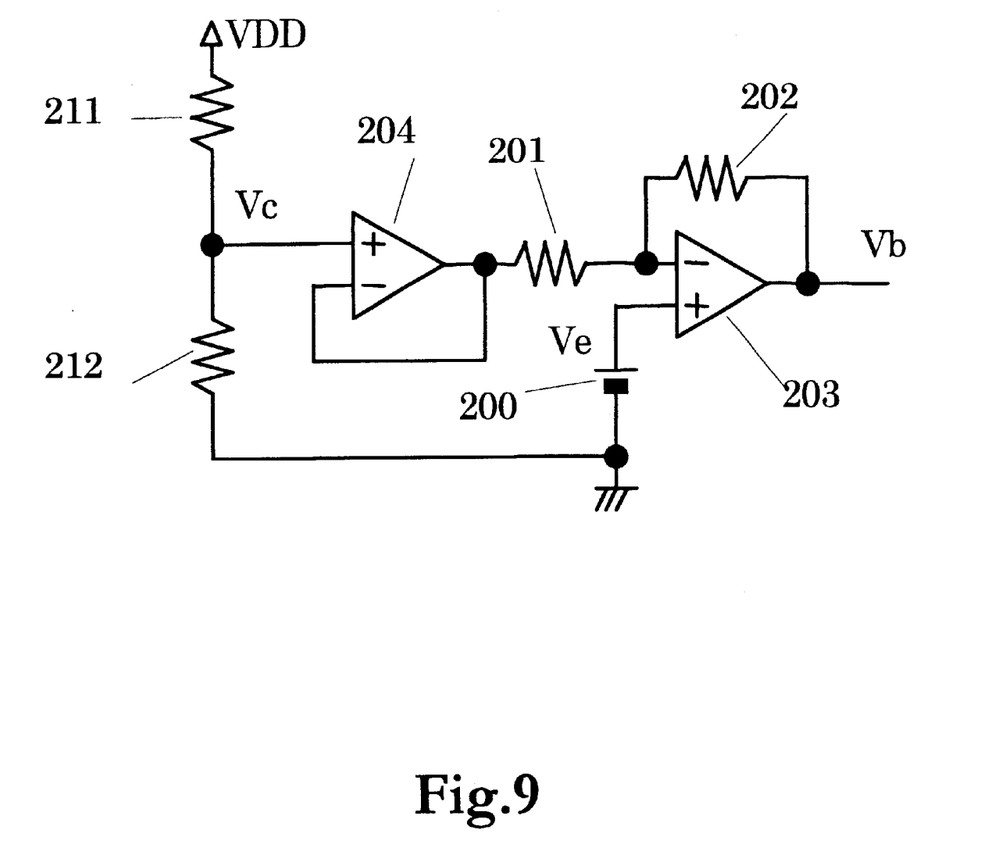
FIG. 9 is an explanatory diagram showing voltage generating circuit 100 of the SW regulator control circuit of the PFM system shown in FIG. 1.

That is, when the supply voltage VDD is high($V_H$), the duty ratio of the output Vosc of the comparator 16 becomes small (FIG. 7), and when the supply voltage VDD is low($V_L$), the duty ratio becomes large (FIG. 8). This is shown in FIG. 2A and FIG. 2B. A solid line a represents the output voltage value Vb1 and Vb2 of the voltage generating circuit 100, and a solid line b represents the duty ratio of the output Vosc of the comparator 16. The axis of abscissa in FIG. 2A and FIG. 2B represents a supply voltage VDD, and as the supply voltage VDD is high, the value of Vb which is an output voltage value of the voltage generating circuit 100 is lowered, and the duty ratio of the output Vosct of the comparator 16 is reduced. FIG. 9 shows an example of voltage generating circuit 100. Resistance 211 and resistance 212 are connected in series to supply voltage VDD.

$$Vc = R212/(R211+R212) \times VDD$$

The voltage of Vc is a voltage in proportional to supply voltage VDD. OP-amp 204 inputs Vc, and is connected to resistance 201. The negative-amplification circuit is formed with resistance 201, resistance 202, and OP-amp 203. Reference voltage circuit 200 is connected to OP-amp 203. Reference voltage circuit 200 outputs constant voltage Ve in OP-amp 203. OP-amp 203 outputs Vb.

$$Vb = Ve - (Vc - Ve)/R201 \times R202$$

Figure 10:
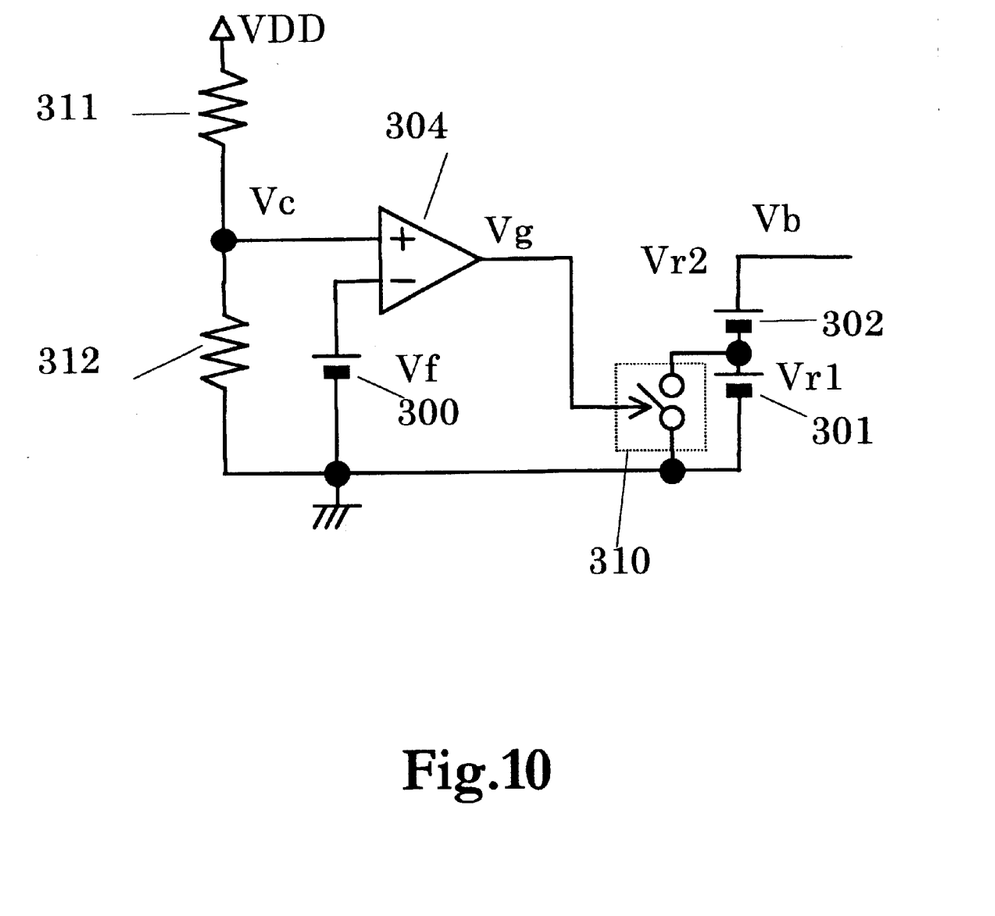
FIG. 10 is an explanatory diagram showing voltage generating circuit 100 of the SW regulator control circuit of the PFM system shown in FIG. 1.

Vb decreases with an increase of supply voltage VDD. FIG. 10 shows another example of voltage generating circuit 100. Reference voltage circuit 300, 301 and 302 out put constant voltages Vf, Vr1 and Vr2 respectively, without regard to supply voltage. Switch element 310 is connected in parallel to reference voltage circuit 301. The output of Reference voltage circuit 301 becomes 0V at the time of switch element 310 is ON(CLOSE). Resistance 311 and resistance 312 are connected in series to supply voltage VDD.

$$Vc = R312/(R311+R312) \times VDD$$

Output Vg of comparator 304 changes at the time of Vc=Vf. Switch element 310 is controlled by output Vg of comparator 304. Switch element 310 becomes ON(CLOSE) at the time of a high "H" output of comparator 304. Switch element 310 becomes OFF(OPEN) at the time of a low "L" output of comparator 304. Switch element 310 goes OFF at the time VDD<(R311+R312)/R312×Vf. As a result Vb=Vr1+Vr2. Switch element 310 goes ON at the time VDD>(R311+R312)/R312×Vf. As a result Vb=Vr2.

In general, the duty ratio of a typical SW regulator of the PFM system is a constant value between about 50 to 90% and does depend on the supply voltage. However, in the present invention, when the supply voltage is low, the duty ratio becomes large to the degree of 80 to 90%, but when the supply voltage is high, the duty ratio becomes 60% or less. With this, when the supply voltage is low, an energy is sufficiently given to the load, and when the supply voltage is high, the ripple voltage can be suppressed to a small value by the small duty ratio.

Figure 3:
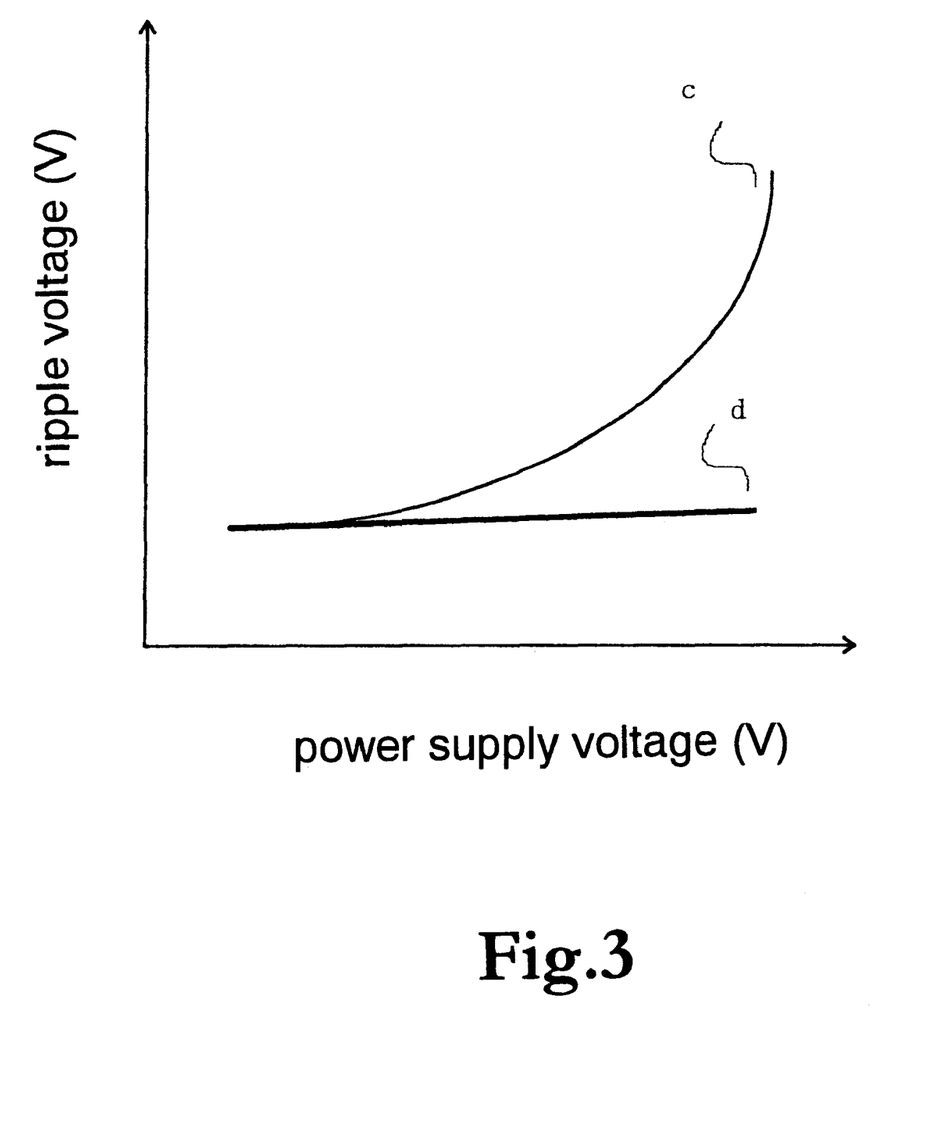
FIG. 3 is an explanatory diagram showing a supply voltage dependency of the ripple voltage in an SW regulator of the PFM system according to the present invention and a conventional SW regulator of the PFM system.

The supply voltage dependency of the ripple voltage in the SW regulator of the PFM system is shown in FIG. 3 with respect to the prior art and the present invention. The axis of abscissa represents a supply voltage whereas the axis of ordinate represents a ripple voltage. A solid line c represents the characteristic of the ripple voltage in the conventional SW regulator, and a solid line d represents the characteristic of the ripple voltage in the SW regulator according to the present invention. In the prior art, since the duty ratio is constant with respect to the supply voltage, when the supply voltage is high, an energy due to one switching operation becomes high with the result that the ripple voltage increases. On the other hand, the present invention can suppresses the ripple voltage.

Figure 4:
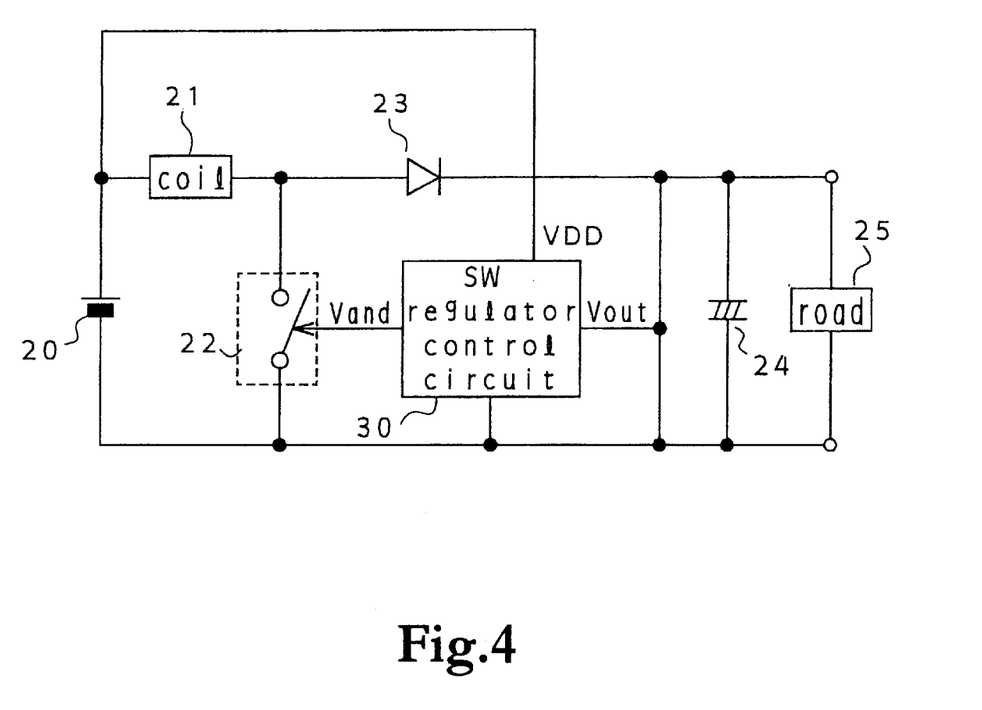
FIG. 4 is an explanatory diagram showing the structure of a boost type SW regulator in accordance with the present invention.
Figure 11:
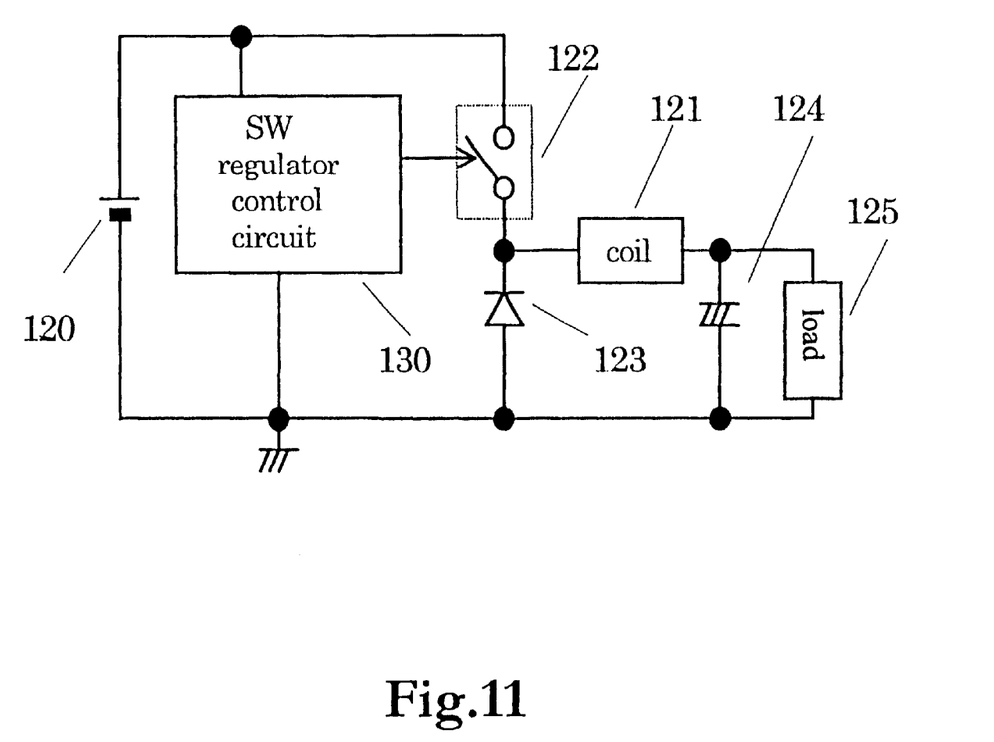
FIG. 11 is an explanatory diagram showing the structure of a step-down type SW regulator in accordance with the present invention.

FIG. 4 shows a structural diagram of a boost type SW regulator in accordance with the present invention. An input power supply 20 is connected with a coil 21 and an SW regulator control circuit 30 of the present invention which is shown in FIG. 1. The SW regulator control circuit 30 controls the on/off operation of a switch element 22 to hold the output voltage to a constant value as described above. A rectifying element 23 is connected between the coil 21 and the output capacitor 24. The load 25 is connected in parallel with the output capacitor. FIG. 11 shows a structural diagram of a step-down type SW regulator in accordance with the present invention. An input power supply 120 is connected with switch element 122 and an SW regulator control circuit 30 of the present invention which is shown in FIG. 1. Switch element 122 other terminal is connected with rectifying element 123 and coil 121. Coil 121 other terminal is connected with output capacitor 124 and load 125.

In other words, the PFM-DUTY ratio of the SW regulator control circuit 30 varies according to the supply voltage (voltage value of the input power supply 20).

The SW regulator control circuit of the PFM system according to the present invention has such an advantage that because supply voltage dependency is given to the duty ratio, the energy supply capacity to the load at the time of a low supply voltage can be increased, and the ripple voltage can be suppressed at the time of a high supply voltage.

What is claimed is:

1. A switching regulator control circuit for a Pulse Frequency Modulation (PFM) type switching voltage regulator, comprising: a comparator circuit for comparing a periodic waveform with a reference voltage and producing an output signal having pulses which have a pulse width dependent upon the value of the reference voltage; and a modulation circuit for receiving an output of the comparator circuit and varying the duty ratio of the PFM type switching voltage regulator in accordance with a power supply voltage of the PFM type switching voltage regulator so that the duty ratio is increased when the power supply voltage of the PFM type switching voltage regulator is decreased and the duty ratio is decreased when the power supply voltage of the PFM type switching voltage regulator is increased.

2. A switching regulator of the PFM type having a switching regulator control circuit as claimed in claim 1.

3. A control circuit for PFM type switching regulator, comprising: a PFM duty ratio setting circuit for setting the duty ratio of the PFM type switching regulator in accordance with a level of a power supply voltage to the PFM type switching regulator, the PFM duty ratio setting circuit comprising an error amplifier for producing an output signal in accordance with a difference between a periodic signal and a reference voltage, wherein the reference voltage varies depending upon a power supply voltage of the PFM type switching regulator.

4. A control circuit according to claim 3; further comprising a modulating circuit for modulating an output of the PFM duty ratio setting circuit, the modulating circuit comprising an error amplifier for producing an output signal in accordance with a difference between a fed back portion of a regulated output voltage of the PFM type switching regulator and a reference voltage.

5. A control circuit according to claim 3; wherein the PFM duty ratio setting circuit comprises a circuit for producing a pulse output signal having successive pulses the width of which is based upon the value of the reference voltage.

6. A control circuit according to claim 3; further comprising a reference voltage generating circuit for generating the reference voltage based upon the power supply voltage of the PFM type switching regulator; wherein the reference voltage varies in an inversely proportional manner with respect to the power supply voltage of the PFM type switching regulator, such that an increase in the power supply voltage results in a decrease in the duty ratio set by the PFM duty ratio setting circuit and a decrease in the power supply voltage of the PFM switching regulator results in an increase in the duty ratio set by the PFM duty ratio setting circuit.

7. A duty ratio setting circuit for a Pulse Frequency Modulation (PFM) type voltage regulator, comprising: a comparison circuit for producing an output signal based on a difference between a predetermined periodic signal having a constant frequency and amplitude and a predetermined reference voltage; a reference voltage generating circuit receptive of a power supply voltage of the PFM type voltage regulator for producing the predetermined reference voltage in accordance therewith so that the predetermined reference voltage varies in an inversely proportional manner with respect to a variation in the power supply voltage; and a circuit for modulating a PFM switching signal with the output of the output signal of the comparison circuit.

8. A control circuit for a Pulse Frequency Modulation (PFM) type switching regulator, comprising: a first circuit for producing a first output signal based on a difference between a fed back portion of a regulated output voltage of a PFM type switching regulator and a first reference voltage; and a second circuit for producing a second output signal based on a second reference voltage, the second output signal being used for modulating the first output signal and comprising a pulse signal having successive pulses the width of which is dependent upon the value of the second reference voltage so that the duty cycle of the PFM type voltage regulator is dependent upon the second reference voltage; wherein the second reference voltage varies depending upon the value of a power supply voltage of the PFM type switching regulator so that the duty ratio is increased when the power supply voltage decreases and the duty ratio decreases when the power supply voltage increases.

* * * * *